J. MUMMA.
Grain-Drill.
No. 18,982. Patented Dec. 29. 1857.
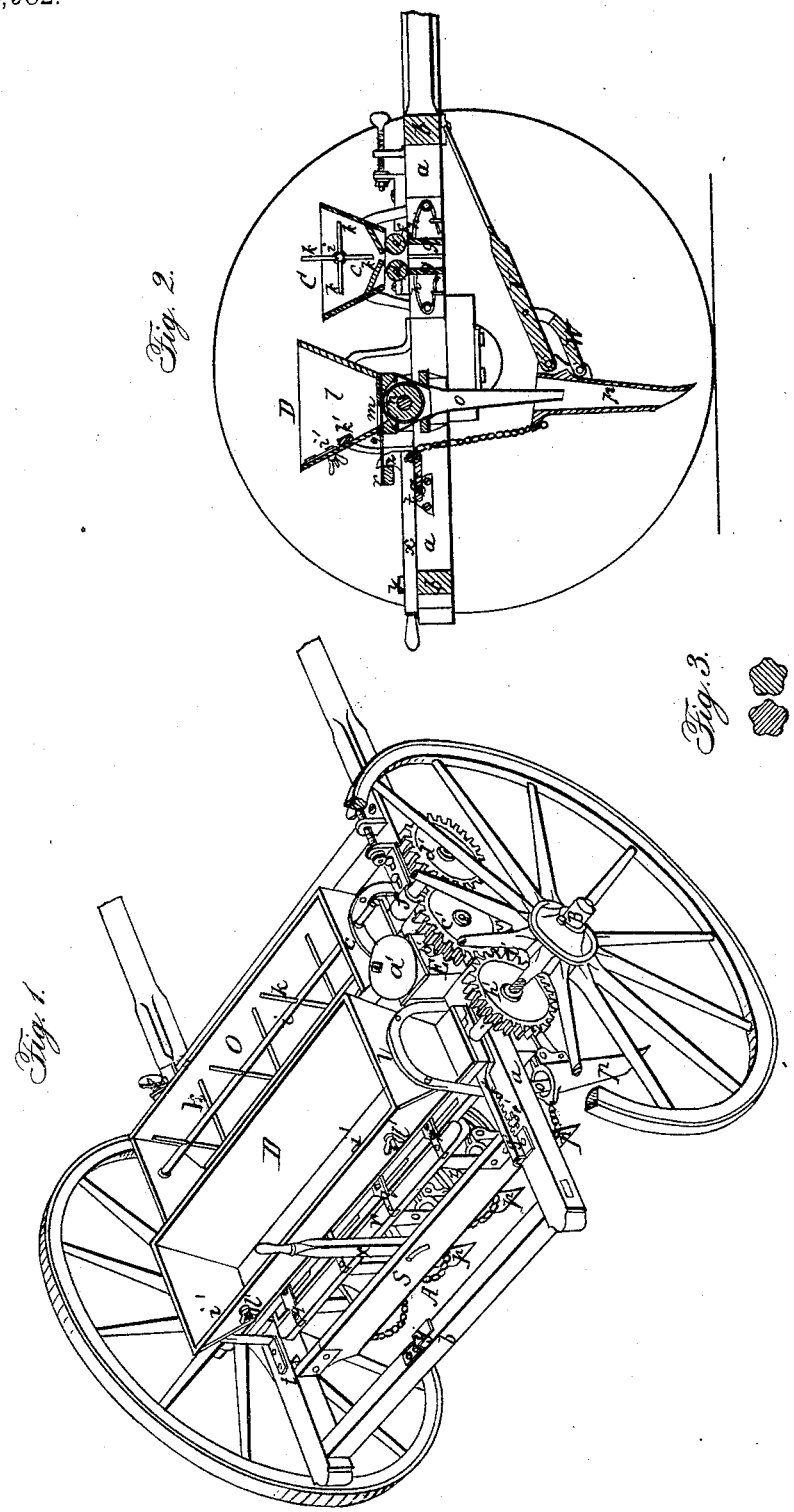

UNITED STATES PATENT OFFICE.

JACOB MUMMA, OF HARRISBURG, PENNSYLVANIA.

IMPROVEMENT IN SEED-DRILLS.

Specification forming part of Letters Patent No. 18,982, dated December 29, 1857.

*To all whom it may concern:*

Be it known that I, JACOB MUMMA, of Harrisburg, in the county of Dauphin and State of Pennsylvania, have made certain new and useful Improvements in Seeding-Machines for Sowing Grain and Pulverized Manures; and I hereby declare that the following is a full, clear, and exact description thereof, reference being had to the accompanying drawings, making part of this specification, in which—

Figure 1 is a perspective view of the machine; and Fig. 2, a vertical section, and Fig. 3 a transverse section, of a pair of fluted crushers.

The letters of reference indicate the same parts in the different figures wherever they occur.

The machine is constructed and arranged in the following manner:

The frame A is composed of two side pieces, $a$, (which are extended forward, forming the shafts of the carriage,) and two cross-pieces, $b$. It rests upon an axle, B, with suitable wheels, and serves to support the various parts of which the machine is composed.

Upon the forward part of the frame A is placed the apparatus C for broadcasting guano, lime, or any pulverized fertilizers. It consists of a hopper, $c$, extending across the frame, and having a longitudinal slot in the bottom corresponding with the space between the two rollers $d$ and $e$, which may be either cylindrical or fluted, as seen in Fig. 3. These rollers are revolved in the manner hereinafter described, and are capable of adjustment by increasing or diminishing the space between the rollers by means of sliding bearings $f$ to the roller $e$, operated by screws. The object of these is twofold. They crush lumps, and by their adjustability regulate the amount which is distributed upon any given quantity of land. Beneath these rollers, and bearing up against them in their whole length, are spring-scrapers $g$, held up by the springs $h$. Their function is to clean off the rollers as they revolve, and prevent clogging, and their yielding nature will render them equally efficacious when the fluted rollers are used. A shaft, $i$, revolves longitudinally in the hopper $c$. It has projecting arms $k$, which stir up and loosen the contents of the hopper to facilitate its passage through the rollers.

Immediately in the rear of the manuring apparatus is the seeding apparatus D. Its hopper $l$ has apertures $m$, through which the grain passes onto a distributing-cylinder, $n$, from whence it passes down through the flexible tubes $o$ and hollow shoes $p$ to the ground. The apertures $m$ are opened and closed by slotted slides $q$, which are fastened at their rear ends to a bar, $r$. Behind this is a swinging bar, $s$, pivoted at $t$ upon one edge, and having upon or near its opposite edge hooks, $u$, from which the shoes $p$ are suspended by chains. The shoes are further sustained in position by the rods $v$ and braces $w$. The bar $s$ has a lever, $x$, attached to it in such a manner that it has a limited lateral motion upon the bar $s$, which admits of its being placed in the hook $y$ when brought down to the position shown in Fig. 2. Two cams, $z$, are fixed to the upper side of the bar $s$, which take hold of the bar $r$ and draw it back with the slides $q$ when the lever $x$ is depressed, thereby closing the apertures $m$. Other slides, $i'$, pass through the apertures $m$ to the cylinder $n$. They are connected at their upper ends to the bar $k'$, and serve to regulate the feed to the cylinder, and consequently the amount of seed sown upon any given quantity of land. The bar $k'$, with the slides attached, can be secured in any desired position by set-screws $l'$.

Upon the frame A is placed an indicator, E, which has a bell, $a'$, connected with any suitable machinery, which shall cause a hammer to strike the bell at any certain number of revolutions of the shaft $b'$. A spur-wheel, $c'$, is keyed onto the end of the shaft $b'$ and meshes into a similar wheel, $d'$, upon a prolongation of the journal of the roller $d$.

The bearing of the cylinder $n$ can be moved upon the frame A by means of a pinion, $e'$, upon one of the pivots of the bar $s$, meshing into the rack $f'$, which is a continuation of the bearing, and which is guided by the staple $g'$. The prolongation of the journal of the cylinder $n$ carries a spur-wheel, $h'$, which, when moved forward by the rack and pinion, meshes into the spur-wheel $c'$ and into the spur-wheel $d'$ upon the hub of the driving-wheel, which thus communicates motion to all the rotating parts, which may be thrown out of gear by bringing down the lever $x$.

I proceed to describe the operation, objects, and advantages of my improvements.

It is well known that to insure the best results in sowing grain and pulverized manures, with due reference to economy, it is necessary that the operation should be performed with the greatest attainable regularity, and that the quantity of each sown per acre should be regulated according to circumstances, and the experience and judgment of the agriculturist. The indicator is so geared that its hammer will strike the bell when the driving-wheel has made a sufficient number of revolutions to carry the machine over an acre of ground, taking into consideration the circumference of the wheels and the width of the machine.

It being decided to sow a given number of bushels of wheat to the acre, that quantity is placed in the hopper $l$. The machine is put in motion. When the driving-wheel has made a sufficient number of revolutions the bell strikes. If the grain has run out too soon, an index-hand connected with the gearing of the indicator will show how much ground has been passed over; or if the whole has not run out when the bell rings, the machine is stopped and the remainder measured. The slides $i$ are then adjusted, and the experiment is repeated until the machine is so regulated that the exact quantity required for one acre shall have passed from the hopper when the bell strikes. The quantity of guano or other fertilizer to be sown to the acre is regulated with the same degree of nicety in a similar manner, its rate of feed being adjusted by increasing or diminishing the space between the feed-rollers.

The above-described operations can be conducted in the barn by propping up the axle and revolving the driving-wheel by hand. The machine can then be taken to the field. On its way there, or when it is not required to deposit the seed, (when turning at the end of the row, for instance,) the lever $x$ is brought down and hooked in $y$, the cams $z$ draw out the bar $r$, which closes the apertures $m$, the shoes $p$ are lifted clear of the ground, and the driving-wheel is thrown out of gear, thus preventing waste of grain or manure, all being accomplished by one motion of the lever $x$.

By preceding the deposit of the seed in drills by the apparatus for broadcasting guano in the manner described, I obtain the important advantage of being enabled to cover in the guano or other concentrated fertilizer without bringing it into actual contact with the seed itself, the shoes $p$, while opening the furrow for the grain, turning the manure in right and left and mixing it intimately with the soil, while the seed is left by itself in the furrow, to be covered by a roller or in any convenient manner.

Having thus fully described my invention, what I claim as new, and desire to secure by Letters Patent of the United States, is—

The combination of the broadcasting apparatus for sowing pulverized manures, with the seed-drills, when the former is placed in advance of the latter, the whole being arranged and operated in the manner and for the purposes herein specified.

In testimony whereof I have signed my name to this specification before two subscribing witnesses.

JACOB MUMMA.

Witnesses:
DAVID MUMMA, JR.,
C. A. SNYDER.